S. SNEDEN.

Boat-Detaching Apparatus.

No. 5,584.

Reissued September 30, 1873.

WITNESSES.

Jas. E. Hutchinson

John R. Young

INVENTOR.

Saml Sneden, by

Prindle and Deane, his

Attorneys

AM. PHOTO-LITHOGRAPHIC Co. N.Y. (OSBORNE'S PROCESS.)

UNITED STATES PATENT OFFICE.

SAMUEL SNEDEN, OF BROOKLYN, NEW YORK.

IMPROVEMENT IN BOAT-DETACHING APPARATUS.

Specification forming part of Letters Patent No. 141,470, dated August 5, 1873; reissue No. 5,584, dated September 30, 1873; application filed September 10, 1873.

*To all whom it may concern:*

Be it known that I, SAMUEL SNEDEN, of Brooklyn, in the county of Kings and State of New York, did invent certain new and useful Improvements in Boat-Detaching Apparatus, for which Letters Patent No. 141,470 were issued to me upon the 5th day of August, 1873, which Letters Patent have been found defective in that the specification and claim do not fully cover and embrace all of the original invention and improvements as contained in the model and drawings filed in the United States Patent Office upon the 9th day of July, 1873. Now, therefore, being desirous to reissue the said Letters Patent in the manner and form prescribed by law, I have prepared, and do hereby declare that the following is, a full, clear, and exact description of the said improvements, reference being had to the accompanying drawings making a part of this specification, in which—

Figure 1:
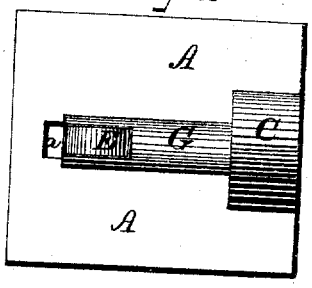
Figure 4:
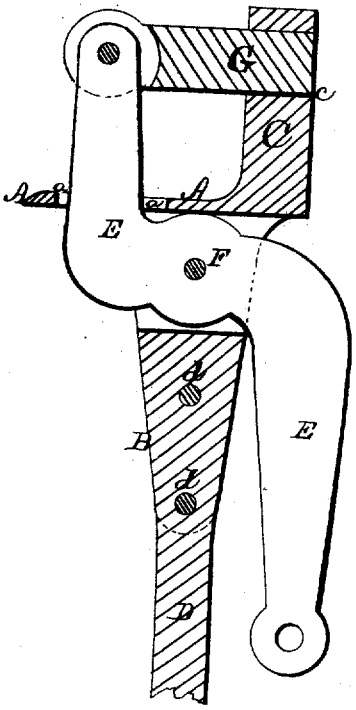
Figure 3:
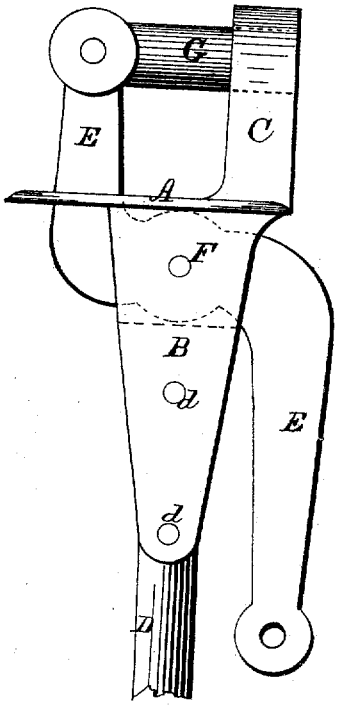
Figure 2:
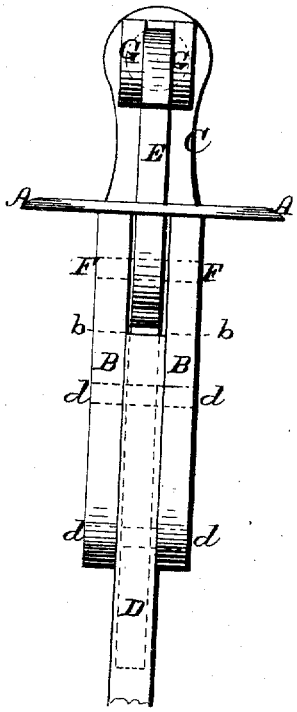

Figure 1 is a plan view of the upper side of my improved apparatus. Figs. 2 and 3 are, respectively, a front and a side elevation of the same; and Fig. 4 is a vertical central section upon a line extending from front to rear.

Letters of like name and kind refer to like parts in each of the figures.

The design of my invention is to increase the safety, efficiency, and ease of operation of appliances for detaching ships' boats from their davits; and it consists in the peculiar construction and combination of the operative parts, substantially as and for the purpose hereinafter specified.

In the annexed drawing, A represents a rectangular metal plate, provided at its lower side with two lugs, B and B, which extend vertically downward in parallel lines, as seen in Fig. 2. Upon the upper side and transverse center, at one end of the plate A, is secured a third vertical lug, C, which contains a horizontal circular opening, *c*, that has a line corresponding in plane to the space *b* between the lugs B and B, while in a line with said opening, but near the opposite end of said plate, is provided a rectangular slot, *a*, that passes vertically downward through the same, said plate with its lugs forming the standard or frame portion of the apparatus, and being attached to the boat by means of a bar, D, that has its upper end fitted to or within the space *b*, and is secured in position by rivets *d*, which pass through the same and through said lugs B. Passing downward through the slot *a* of the plate A is a lever, E, which, immediately below said plate, extends in a curve horizontally through the upper end of the space *b*, and at the opposite side of the lugs B curves downward, as shown in Fig. 3. A pin, F, passing horizontally through said lugs B and through said lever E, forms a pivotal bearing, upon which the latter oscillates upon a vertical plane, the degree of such movement being determined by the length of said slot *a* with relation to the portion of said lever which is contained therein. The upper end of the lever E is upon a line, horizontally, with the opening *c* of the lug C, and has pivoted thereto one end of a bar, G, the opposite end of which corresponds to said opening *c*, and is contained therein whenever said lever is moved toward said lug C; but when moved to its farthest limit away from the latter, the outer end of said bar or bolt G is released and rendered capable of being turned upward to the position shown by the dotted lines of Fig. 3.

The device thus constructed is applied to one end of a boat in such a manner as to enable the hook at the lower end of a fall-tackle block to be engaged with the bolt G, and said boat to be suspended in the usual manner.

When it is desired to detach the boat, the lever E and a similar lever upon the detaching apparatus at the opposite end of the boat are simultaneously drawn inward at their lower ends, so as to move their upper ends outward and detach the bolts G from their engaging lugs, upon which said bolts will turn upward to the position shown in Fig. 3, and permit the falls-hooks to slide therefrom. The motion of the upper end of the lever is controlled laterally, and in a line fore and aft the boat, by the sides of the slot through which it passes, while the vertical strain upon said lever is borne primarily by its pivotal bearing, and, in the event of breakage of the latter, secondly, by the horizontal portion of said lever, which bears against the lower side of the plate A and the lower vertical portion of said lever, which bears against the side of the bar D, such arrangement of parts rendering practically impossible the accidental displacement of the locking-bolt in consequence of the breakage of said pivotal bearing.

The apparatus described is strong, durable, and efficient, easily applied and operated, not liable to get out of order, and, from the simplicity of its parts, capable of being furnished at a comparatively small cost.

Having thus fully set forth the nature and merits of my invention, what I claim as new is—

The frame consisting of the plate A, provided with the slot *a*, the lugs B and B, and the lug C, provided with the opening *c*, in combination with the lever E and bolt G, substantially as and for the purpose specified.

In testimony whereof I have hereunto set my hand this 2d day of September, 1873.

SAMUEL SNEDEN.

Witnesses:

GEORGE B. STAYLEY,

WM. A. C. STARK.